(12) United States Patent
Burke et al.

(10) Patent No.: US 8,462,367 B2
(45) Date of Patent: Jun. 11, 2013

(54) PRINTER VOICE PORTAL

(75) Inventors: Paul Michael Burke, Bedford, NH (US); Scott McGlashan, Kista (SE)

(73) Assignee: Hewlett-Packard Development Company, L.P., Houston, TX (US)

( * ) Notice: Subject to any disclaimer, the term of this patent is extended or adjusted under 35 U.S.C. 154(b) by 2222 days.

(21) Appl. No.: 11/054,551

(22) Filed: Feb. 10, 2005

(65) Prior Publication Data

US 2006/0176505 A1     Aug. 10, 2006

(51) Int. Cl.
*G06F 3/12* (2006.01)

(52) U.S. Cl.
USPC ......... 358/1.15; 358/1.14; 705/235; 705/246; 705/260; 379/907

(58) Field of Classification Search
USPC . 358/1.15, 1.14; 704/235, 246, 260; 379/907; 705/235, 246, 260
See application file for complete search history.

(56) References Cited

U.S. PATENT DOCUMENTS

| | | | |
|---|---|---|---|
| 5,051,924 A | | 9/1991 | Bergeron et al. |
| 5,950,167 A * | | 9/1999 | Yaker ............................ 704/275 |
| 6,219,639 B1 * | | 4/2001 | Bakis et al. ................... 704/246 |
| 6,751,589 B1 * | | 6/2004 | Guillemin ..................... 704/235 |
| 7,006,968 B2 * | | 2/2006 | Norris et al. .................. 704/235 |
| 7,302,048 B2 * | | 11/2007 | Evans et al. ................ 379/88.14 |
| 7,370,090 B2 * | | 5/2008 | Nakaoka et al. .............. 709/219 |
| 2002/0049535 A1 | | 4/2002 | Rigo et al. |
| 2002/0080927 A1 * | | 6/2002 | Uppaluru ................... 379/88.01 |
| 2002/0138557 A1 * | | 9/2002 | Mukaiyama et al. ......... 709/203 |
| 2002/0161830 A1 * | | 10/2002 | Mukaiyama et al. ......... 709/203 |
| 2002/0184302 A1 * | | 12/2002 | Prueitt et al. .................. 709/203 |
| 2002/0186408 A1 * | | 12/2002 | Nakaoka et al. ............. 358/1.15 |
| 2003/0086114 A1 * | | 5/2003 | Cherry et al. ................ 358/1.15 |
| 2004/0001217 A1 * | | 1/2004 | Wu .............................. 358/1.15 |
| 2004/0034529 A1 | | 2/2004 | Hooper, III |
| 2004/0125401 A1 * | | 7/2004 | Earl et al. ..................... 358/1.15 |
| 2004/0201860 A1 * | | 10/2004 | Nakaoka et al. ............... 358/1.1 |
| 2005/0174585 A1 * | | 8/2005 | Ito et al. ......................... 358/1.1 |

\* cited by examiner

*Primary Examiner* — Jacky X Zheng

(57) ABSTRACT

A printer portal including a network connection arranged to transfer user voice command input and printer portal output, a telephony system arranged to receive user voice command input and generate printer portal output via the network connection, a printing device arranged to print information responsive to the telephony system based on the user voice command input, and an access module arranged to control user access to portions of the printer portal is described. The printer portal stores location information about the printer portal. A method for printing information at a printer portal is described. A user voice command input is received at a printer portal. The printer portal analyzes the command input using a telephony system. Information is printed at the printer portal if the command input includes a print request to print information at the printer portal.

18 Claims, 5 Drawing Sheets

PRINTER VOICE PORTAL

FIELD OF THE INVENTION

The present invention relates to a printer connected with an interactive voice response system.

BACKGROUND

It is known in the art to use a printer connected to a computer system to print documents and to connect a portable hand-held device to a printer to print documents.

Printing from telephones typically requires a telephonic device having printing capabilities, e.g., a smartphone class of phone facilitating the print formatting and print driver, i.e., a device resulting from the combination of a cellular telephone and a personal digital assistant. This requires special applications loaded into the phone in order to print on the printer. Additionally, telephones require either wired connections, e.g., USB, serial, or parallel, etc., or wireless connections, e.g., infrared or Bluetooth, etc. Problematically, not all phones are smartphones having IR or Bluetooth connectivity capability.

A network printer in a public location, such as a print kiosk in a shopping mall, typically includes an IP address identifying the printer on the network. However, the network address, e.g., formatted as a period separated sequence of numbers such as 192.167.1.1 using Internet Protocol (IP) version 4 addressing and as a colon separated sequence of numbers typically including eight groups of 4 hexadecimal digits, such as 3ffe:6a88:85a3:08d3:1319:8a2e:0370:7344, is not conducive to entry using a typical telephonic device as neither a colon nor a period are typically found on telephone keypads. In particular, entry of these symbols requires additional user key presses.

Additionally problematic, printer software appropriate for the network printer must be installed in the telephonic device in order to enable printing from the telephonic device to the printer.

SUMMARY

An apparatus aspect includes a printer portal including a network connection arranged to transfer user voice command input and printer portal output, a telephony system arranged to receive user voice command input and generate printer portal output via the network connection, a printing device arranged to print information responsive to the telephony system based on the user voice command input, and an access module arranged to control user access to portions of the printer portal is described. The printer portal stores location information about the printer portal.

A method aspect for printing information at a printer portal includes receiving user voice command input at the printer portal. The printer portal analyzes the command input using a telephony system. Information is printed at the printer portal if the command input includes a print request to print information at the printer portal.

Still other advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

In contrast with the above-described approaches, the mechanism of the present invention provides a printer portal having a telephony interface for receiving user voice command input via a telephone.

Figure 1:
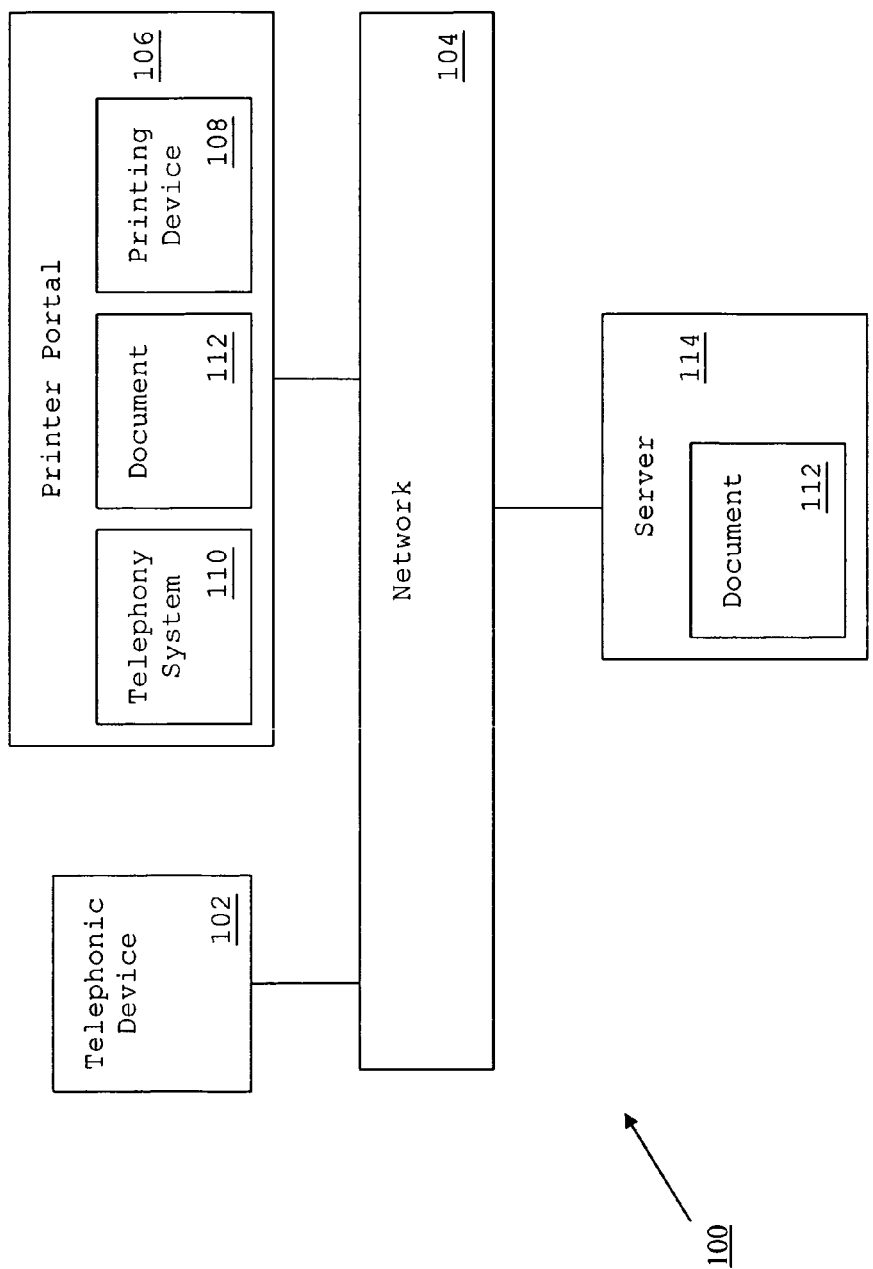
FIG. 1 is a high level block diagram of a system usable in conjunction with an embodiment according to the present invention.

In a first embodiment of a network printing system 100 according to the present invention as depicted in FIG. 1, a telephonic device 102, e.g., a wireline telephone, a mobile or cellular telephone, a phone-based personal digital assistant, a network-based telephone, or other similar device, connects to a communication network 104, e.g., a telecommunication network such as a cellular telephone network, a public switched telephone network, an internet protocol based network, etc.

A printer portal 106, e.g., a networked printing device (described below in conjunction with FIG. 4), includes a printing device 108 such as an inkjet printer, laser printer, or other similar device and has a communication interface (not shown) for connecting to communication network 104. Printer portal 106 includes a telephony system 110 for communicating with a user of telephonic device 102 and receiving user voice command input. In an embodiment, printer portal 106 further stores a document 112 for access and/or printing upon user command input received from a user of telephonic device 102.

Telephony system 110 interacts with a user by generating audio signals transmitted to the user via telephonic device 102 and receiving user voice command input from telephonic device 102 via communication network 104. In an embodiment, telephony system 110 is an interactive voice response system providing a menu of options, e.g., services available, to a user and receiving user voice commands as input to cause the telephony system to, in turn, cause the printer portal to perform one or more of several tasks, as described in detail below. For example, a user using telephonic device 102 is able to obtain information from printer portal 106 regarding the portal's physical location and surroundings and/or cause the printer portal to print information, e.g., coupons, directions, maps, tickets, menus, movie listings, etc., relevant to the portal location, and/or documents accessible by the printer portal via the network 104. Telephony system 110 may be implemented in either software, hardware, or a combination of hardware and software according to differing embodiments of the present invention.

In another embodiment, telephony system 110 is an interactive voice response (IVR) system, for automated interaction with users via communication network 104. According to such an embodiment of telephony system 110, a user using telephonic device 102 dials the telephone number assigned to printer portal 106 and interacts with an automated system via voice commands and/or user input via telephonic device 102, e.g., keypad input. In an embodiment, user input is via voice commands acted upon by printer portal 106 using telephony system 110. In a particular embodiment, telephony system 110 as an IVR system performs voice recognition to receive user voice command input.

Figure 2:
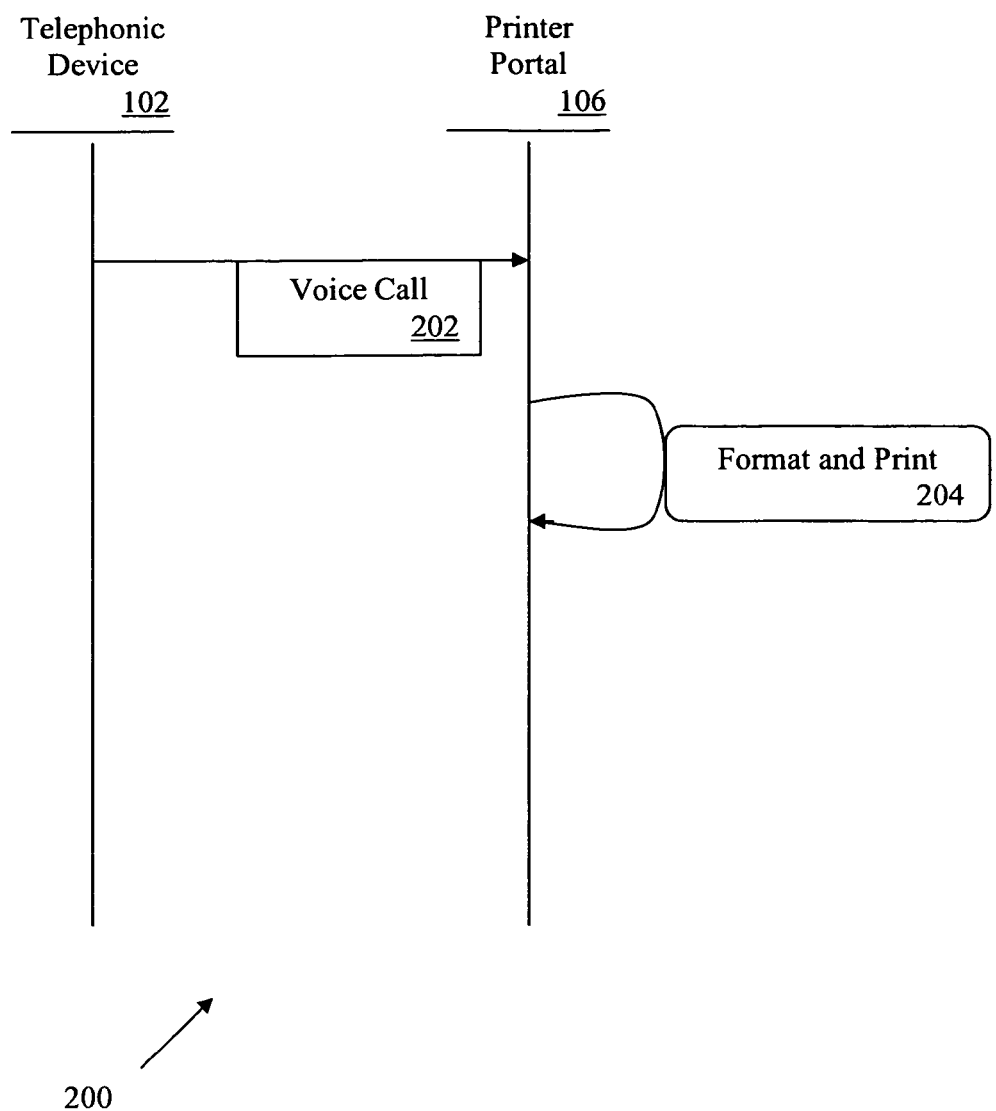
FIG. 2 is a message flow diagram of an embodiment.

FIG. 2 is a message flow diagram 200 of an embodiment according to the present invention where telephony system 110 is an IVR system. Telephony system 110 of printer portal 106 receives a voice call 202 from a user of telephonic device 102. During the course of voice call 202, printer portal 106 accepts the call and audio signals are transferred between telephonic device 102 and printer portal 106 via communication network 104.

In an embodiment, the user speech at telephonic device 102 is transmitted to printer portal 106. For example, the user verbally requests printing of a document 112 stored at printer portal 106. Telephony system 110 recognizes the user voice command input, i.e., the user request for a document to be printed via printing device 108, and causes printer portal 106 to format and print the document 112 during process 204.

In an embodiment, the user requests printing of a document 112 located at a server 114 accessible via network 104. The user speech at telephonic device 102 is voice command input transmitted to printer portal 106 during voice call 202 to provide a document identifier, e.g., a uniform resource locator (URL) of a document available on a web site. That is, the user uses telephonic device 102 to call printer portal 106 and verbally request printing of a specified document identifier.

Advantageously, a user at a location having a printer portal as described above is able to call the printer portal and request printing of a document using voice commands input via a telephone.

In an alternate embodiment, printer portal 106 responds using audio signals to voice call 202 by providing a menu of available functions at the printer portal. For example, printer portal 106 can identify stored documents at the printer portal available for printing such as maps, tickets, menus, etc. Additionally, after the user is identified by printer portal 106 via an access module, the user is able to select previously transmitted documents queued at the printer portal and cause them to be printed.

Location

Printer portal 106 stores location information regarding the position of the printer portal itself, i.e., the printer portal includes location knowledge such as latitude, longitude, map-related positioning, etc. In a particular embodiment, further location information stored at printer portal 106 includes information regarding the immediate environment of the printer portal such as whether the printer portal is located indoors or outdoors, in a public location or a private location, at a transportation center such as a railroad, airport, seaport, bus stop/station, etc., at an entertainment venue such as a theater, a stadium, or at or near a combination of one or more of the preceding locations.

In alternative embodiments, printer portal 106 obtains location information from one or more sources, such as an internal or external navigation system, e.g., GLONASS, GPS, etc., preset information assigned at system startup or during operation of the printer portal, and other mechanisms.

In an embodiment, printer portal 106 receives location information from telephonic device 102 during or immediately preceding a voice call from a user of the telephonic device. Printer portal 106 compares the received telephonic device location information with the printer portal location information in order to determine proximity of the telephonic device to the printer portal. Based on the proximity of the telephonic device 102 to printer portal 106, particular functionality of the printer portal may be selectively enabled and disabled thereby alternatively granting and denying access to particular functions of the printer portal by a user of the telephonic device. In a further embodiment, based on the proximity determination, telephony system 110 tailors the menu of services provided to the user of telephonic device 102.

Access

In a further embodiment, printer portal 106 further includes an access module for controlling access to functionality and documents stored on printer portal 106. Access module may be implemented in hardware, software, or a combination thereof. The access module controls access by a user of telephonic device 102 to storage and functionality on printer portal 106 using one or more of a number of identification mechanisms, e.g., password request, user identifier and password verification, voiceprint recognition, etc. In a further specific embodiment, a user requesting access of access-controlled functionality or storage of printer portal 106 is challenged to provide an appropriate response. In an alternative embodiment, user voice command input itself is monitored in order to determine access ability of a particular user.

In a non-limiting example, a user may use a keyboard attached to another computer such as server 114 to transmit a document 112 to a print queue at printer portal 106. Transmission and/or storage of document 112 to the printer portal print queue may require the user to have permission to print to the printer portal or require the user to submit a password to be required later in order to allow the user to request printing of the document 112 at the printer portal. After document 112 is transmitted to the printer portal print queue, the user uses telephonic device 102 to provide voice command input including a document identifier and, for example, a password via network 104 to request printing of document 112 stored at printer portal 106. After printer portal 106 verifies the password, the printing device 108 formats and prints document 112.

Figure 5:
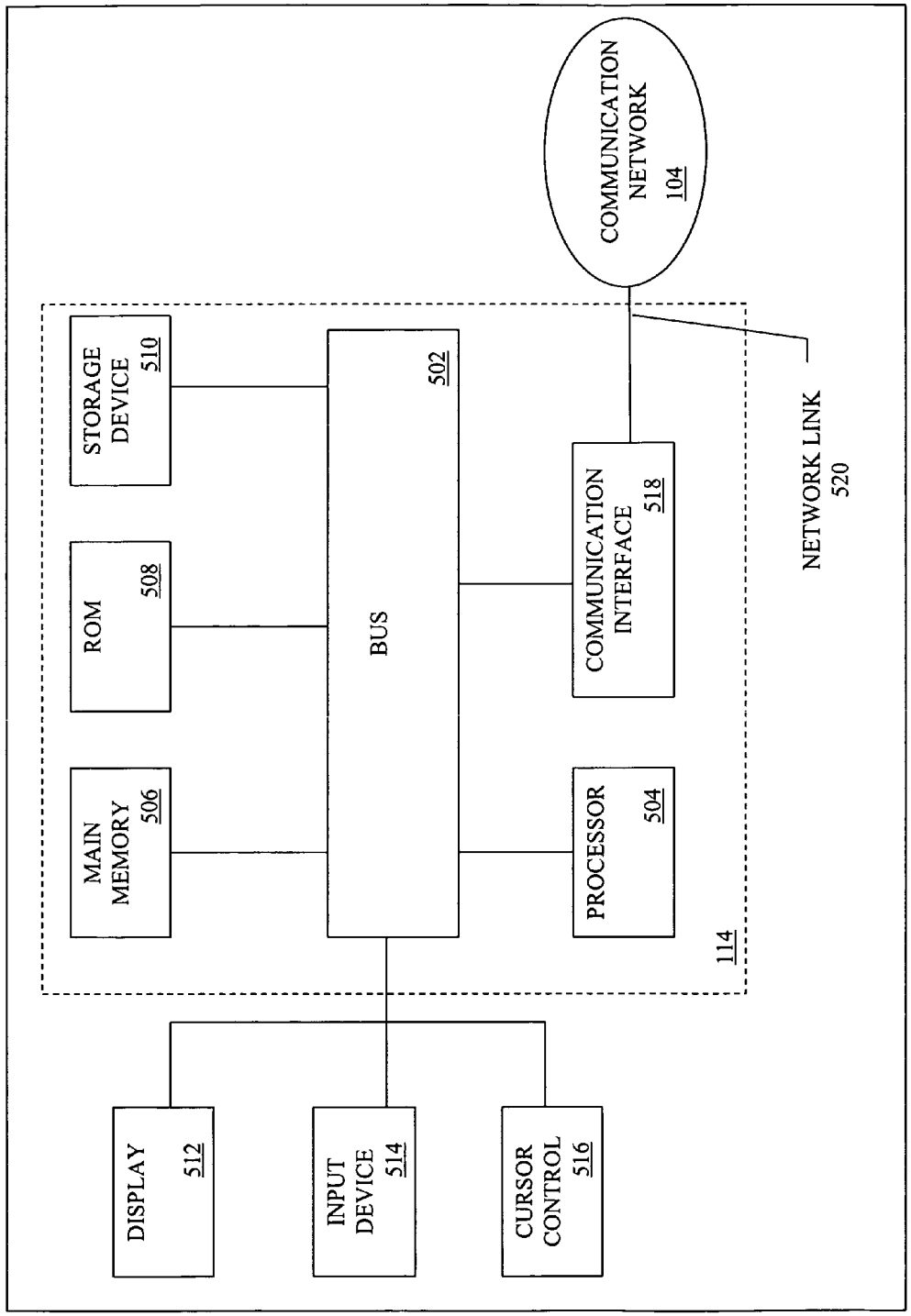
FIG. 5 is a high level block diagram of a server usable in conjunction with an embodiment.

Additionally, a server 114, e.g., a computer system (described below in conjunction with FIG. 5), or other similar device, connects to communication network 104 and stores a document 112 in memory 506 or storage device 510 (FIG. 5). More than one telephonic device 102, printer portal 106, server 114, and network 104 may be interconnected; however, for clarity only one of each element is described. Further, as described below, document 112 is able to be stored at printer portal 106 and/or server 114.

A phone number is assigned to both telephonic device 102 and printer portal 106 enabling communication network 104 to transfer communication between the telephonic device and the printer portal. Telephonic device 102 is configured to enable transmission of audio communication, e.g., user voice command input, to a phone number of communication network 104 and receive audio communication from the phone number. For example, telephonic device 102 receives and audibly transmits sound prompts to the user, e.g., using a text-to-speech engine.

Additionally, printer portal 106 is configured to transmit request messages, e.g., hypertext transport protocol (HTTP) request messages, file transfer protocol (FTP) messages, etc., and receive reply messages to/from server 114 using communication network 104. In this manner, printer portal 106 is able to request document 112 from server 114 by transmitting a request message to the server and receiving the document from the server over communication network 104. After receipt of document 112, printer portal 106 proceeds to format and print the received document.

Server 114, e.g., a web server, a file server, or other similar devices, has a network address, e.g., www.hp.com, 192.168.1.23, etc., accessible via communication network 104. Server 114 stores a document 112, e.g., a word processing document, a spreadsheet, a web page, or other printable file. Server 114 is assigned a network address, e.g., an IP address, a uniform resource location (URL), etc.

Figure 3:
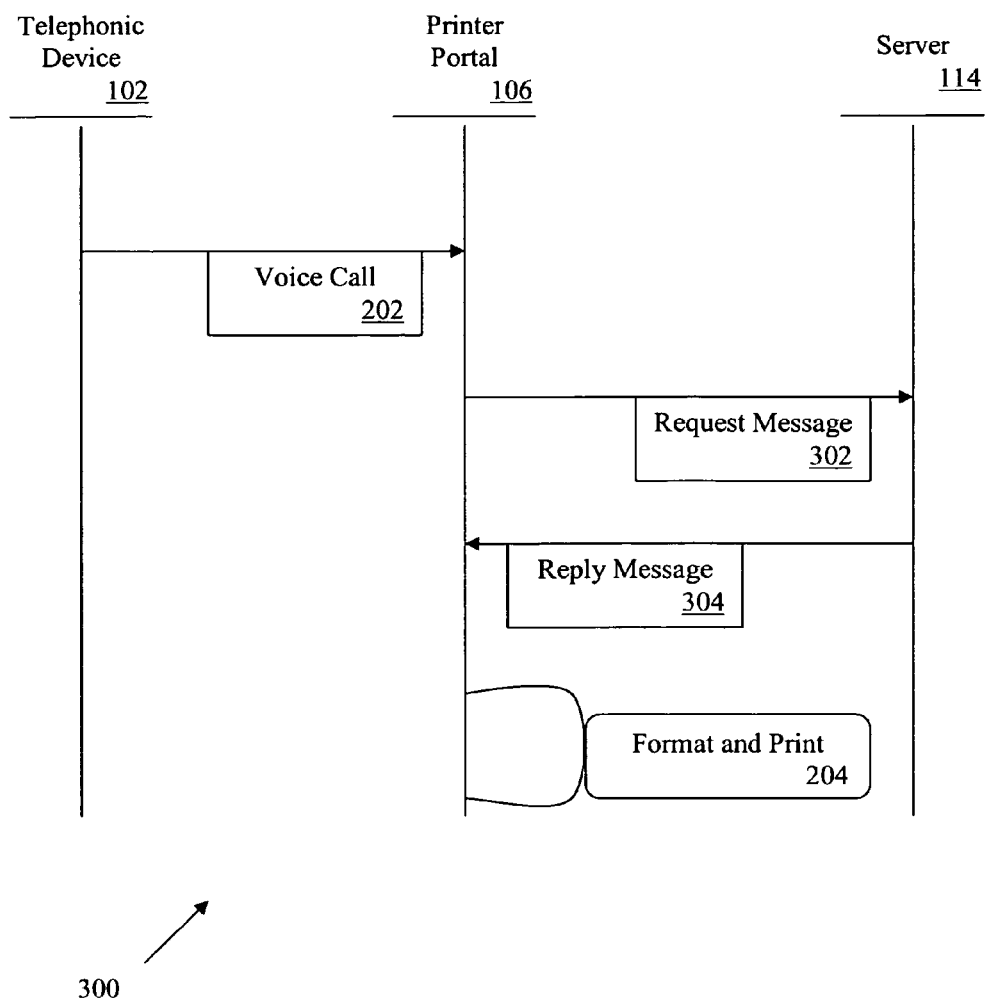
FIG. 3 is another message flow diagram of an embodiment.

FIG. 3 depicts another message flow diagram 300 of another embodiment according to the present invention where telephony system 110 is an IVR system. Similar to FIG. 2 described above, a user of telephonic device 102 initiates a voice call 202 with printer portal 106. Printer portal 106 audibly provides a menu of available services to telephonic device 102.

The user provides voice command input to printer portal 106 via telephonic device 102 directing printer portal 106 to print a document 112 located at server 114. Printer portal 106 determines the location of document 112 from voice call 202 and transmits a request message 302 to server 114 via network 104. Request message 302, e.g., a hypertext transport protocol (HTTP) message, file transfer protocol (FTP) message, etc., includes a document identifier, e.g., a URL, identifying a document 112 located on server 114. After receipt of request message 302, server 114 transmits a reply message 304 including the requested document 112 identified in request message 302 to printer portal 106 via network 104. After receipt of reply message 304, printer portal 106 formats and prints document 112 including in reply message 304 using printing device 108. In this manner, the user is able to use telephonic device 102 to provide a document identifier, e.g., a URL, of a document 112 to be printed to printer portal 106 where the document is located on a server 114 connected to network 104 and accessible by printer portal 106.

Figure 4:
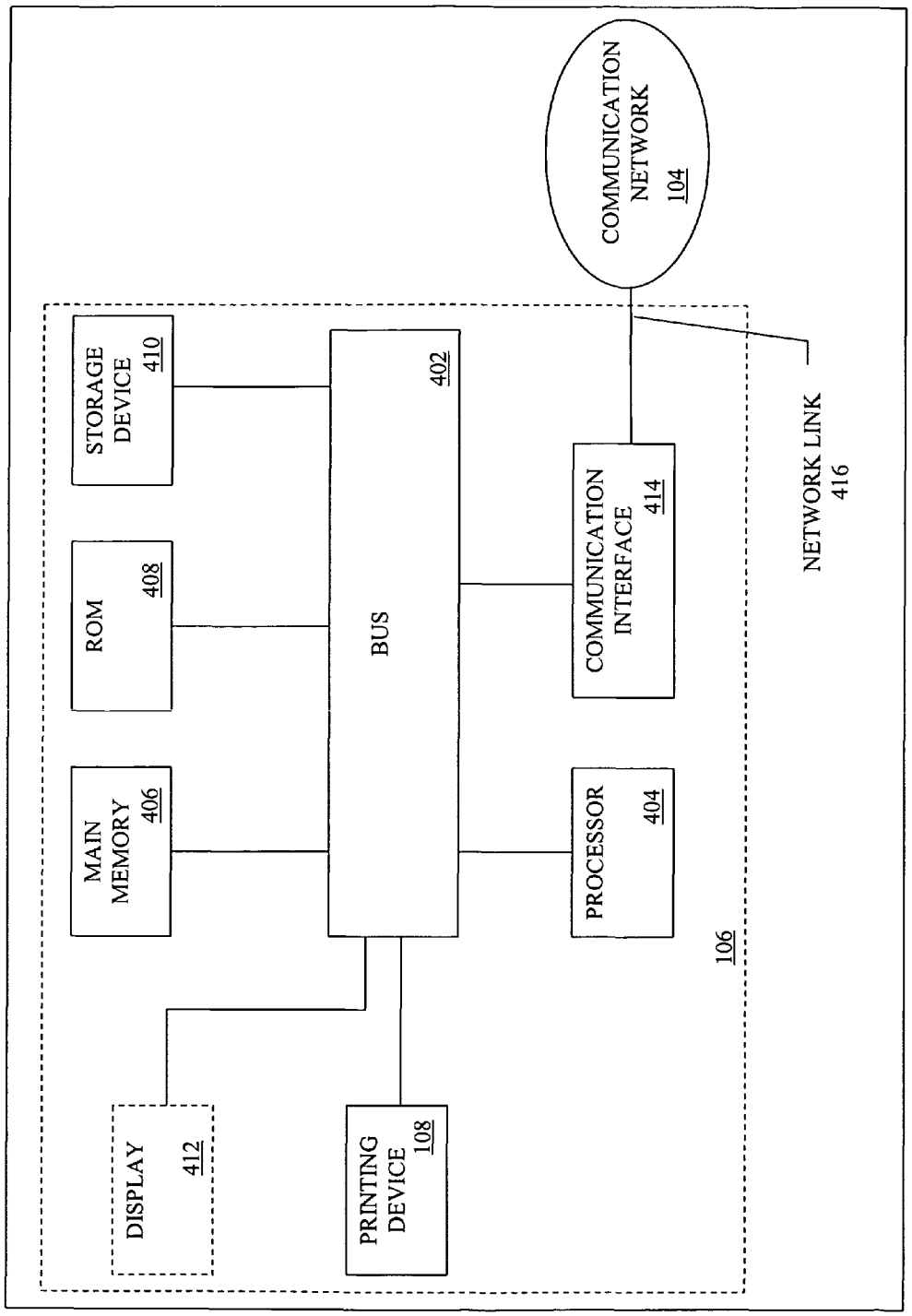
FIG. 4 is a high level block diagram of a printer portal usable in conjunction with an embodiment.

Printer portal 106, depicted in FIG. 4, includes a bus 402 or other communication mechanism for communication information, and a processor 404 coupled with the bus for processing information. Printer portal 106 also includes a main memory 406, such as a random access memory (RAM) or other dynamic storage device, coupled to the bus 402 for storing data, e.g., document 112, and instructions to be executed by processor 404. Main memory 406 also may be used for storing temporary variables or other intermediate information during execution of instructions to be executed by processor 404. Printer portal 106 further includes a read only memory (ROM) 408 or other static storage device coupled to the bus 402 for storing static information and instructions for the processor 404. A storage device 410, such as a magnetic disk or optical disk, is provided and coupled to the bus 402 for storing data, and instructions.

Printer portal 106 may be coupled via the bus 402 to a display 412. A printing device 108, as described above, is coupled to the bus 402 for receiving commands and information, e.g., document 112, to be printed.

According to an embodiment of the invention, printer portal 106 responds to input received via communication network 104 from telephonic device 102 by processor 404 executing sequences of instructions contained in main memory 406. Such instructions may be read into main memory 406 from another readable medium, such as storage device 410.

However, the readable medium is not limited to devices such as storage device 410. For example, the readable medium may include a floppy disk, a flexible disk, hard disk, magnetic tape, or any other magnetic medium, a compact disc-read only memory (CD-ROM), any other optical medium, punch cards, paper tape, any other physical medium with patterns of holes, a RAM, a programmable read only memory (PROM), an electrically programmable read only memory (EPROM), a FLASH-EPROM, any other memory chip or cartridge, a carrier wave embodied in an electrical, electromagnetic, infrared, or optical signal, or any other medium from which printer portal 106, e.g., processor 404, can read. Execution of the sequences of instructions contained in the main memory 406 causes the processor 404 to perform the process steps described below. In alternative embodiments, hard-wired circuitry may be used in place of or in combination with software instructions to implement the invention. Thus, embodiments of the invention are not limited to any specific combination of hardware circuitry and software.

Printer portal 106 also includes a communication interface 414 coupled to the bus 402. Communication interface 414 provides two-way data communication, e.g., digital or analog data or voice communication. For example, communication interface 414 may be a cellular communication device, an integrated services digital network (ISDN) card, a digital subscriber line (DSL) card, or a modem to provide a data communication connection to a corresponding type of telephone line. As another example, communication interface 414 may be a local area network (LAN) card to provide a data communication connection to a compatible LAN. Wireless links may also be implemented. In any such implementation, communication interface 414 sends and receives electrical, electromagnetic or optical signals which carry digital data streams representing various types of information. Of particular note, the communications through interface 414 may permit transmission or receipt of print messages, voice calls, request messages, and reply messages. For example, printer portal 106 and server 114 may be networked together in a conventional manner with each using the communication interface 414.

Network link 416 typically provides data or voice communication through one or more networks to other devices. For example, network link 416 may provide a connection through communication network 104 to telephonic device 102 or printer portal 106. Communication network 104 uses electrical, electromagnetic or optical signals which carry data streams. The signals through the various networks and the signals on network link 416 and through communication interface 414, which carry the data to and from printer portal 106, are exemplary forms of carrier waves transporting the information.

Printer portal 106 can send messages and receive data, including program code, through the network(s), network link 416 and communication interface 414. The received code may be executed by processor 404 as it is received, and/or stored in storage device 410, or other non-volatile storage for later execution. In this manner, printer portal 106 may obtain application code in the form of a carrier wave.

Server 114, depicted in FIG. 5, includes a bus 502 or other communication mechanism for communicating information, and a processor 504 coupled with the bus 502 for processing information. Server 114 also includes a main memory 506, such as a random access memory or other dynamic storage device, coupled to the bus 502 for storing data, e.g., document 112, and instructions to be executed by processor 504. Main memory 506 also may be used for storing temporary variables or other intermediate information during execution of instructions to be executed by processor 504. Server 114 further includes a ROM 508 or other static storage device coupled to the bus 502 for storing static information and instructions for the processor 504. A storage device 510, such as a magnetic disk or optical disk, is provided and coupled to the bus 502 for storing data, and instructions.

Server 114 may be coupled via the bus 502 to a display 512, such as a cathode ray tube (CRT) or a flat panel display. An input device 514, including alphanumeric and function keys, is coupled to the bus 502 for communicating information and command selections to the processor 504. Another type of user input device is cursor control 516, such as a mouse, a trackball, or cursor direction keys for communicating direction information and command selections to processor 504 and for controlling cursor movement on the display 512. This input device typically has two degrees of freedom in two axes, a first axis (e.g., x) and a second axis (e.g., y) allowing the device to specify positions in a plane.

According to an embodiment of the invention, server 114 responds to input received via communication network 104 from telephonic device 102 by processor 504 executing sequences of instructions contained in main memory 506. Such instructions may be read into main memory 506 from another readable medium, such as storage device 510.

However, the readable medium is not limited to devices such as storage device 510. For example, the readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which server 114 can read. Execution of the sequences of instructions contained in the main memory 506 causes the processor 504 to perform the process steps described below. In alternative embodiments, hard-wired circuitry may be used in place of or in combination with computer software instructions to implement the invention. Thus, embodiments of the invention are not limited to any specific combination of hardware circuitry and software.

Server 114 also includes a communication interface 518 coupled to the bus 502. Communication interface 508 provides two-way data communication, e.g., digital or analog data or voice communication. For example, communication interface 518 may be a cellular communication device, an integrated services digital network (ISDN) card, a digital subscriber line (DSL) card, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information. Of particular note, the communications through interface 518 may permit transmission or receipt of print messages, voice calls, request messages, and reply messages. For example, two or more servers 114 may be networked together in a conventional manner with each using the communication interface 518.

Network link 520 typically provides data or voice communication through one or more networks to other devices. For example, network link 520 may provide a connection through communication network 104 to telephonic device 102 or printer portal 106. Communication network 104 uses electrical, electromagnetic or optical signals which carry data streams. The signals through the various networks and the signals on network link 520 and through communication interface 518, which carry the data to and from server 114, are exemplary forms of carrier waves transporting the information.

Server 114 can send messages and receive data, including program code, through the network(s), network link 520 and communication interface 518. The received code may be executed by processor 504 as it is received, and/or stored in storage device 510, or other non-volatile storage for later execution. In this manner, server 114 may obtain application code in the form of a carrier wave.

It will be readily seen by one of ordinary skill in the art that embodiments of fulfill one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

What is claimed is:

1. A printer portal, comprising:
   a network connection arranged to transfer user voice command input and printer portal output;
   a telephony system arranged to receive said user voice command input via the network connection from a telephonic device used by a user of the printer portal and to generate a printer portal output via said network connection;
   a printing device arranged to print documents stored at the printer portal or documents accessible via the network and responsive to the printer portal output from said telephony system based on said user voice command input;
   an access module arranged to control user access to portions of said printer portal;
   electronic storage for storing physical location information for the printer portal; and
   a processor configured to compare a received location of the telephonic device used by the user with the printer portal's physical location information, configured to determine the proximity of the telephonic device to the location of the printer portal and, based on at least the proximity of the telephonic device to the printer portal, configured to selectively enable and disable particular functionality of the printer portal.

2. The printer portal of claim 1, wherein said telephony system includes an interactive voice response system.

3. The printer portal of claim 1, wherein the printer portal stores a selective menu of services based on the proximity of a telephonic device used by the user to the printer portal location.

4. The printer portal of claim 1, wherein said printing device includes a print queue for storing information to be printed at a later time.

5. The printer portal of claim 1, wherein said access module controls user access to a print queue.

6. The printer portal of claim 1, wherein said access module controls user access to previously queued items to be printed.

7. The printer portal of claim 1, wherein said network connection transfers a request for a document from the said telephony system to the printer portal.

8. The printer portal of claim 1, wherein a transferred information request is based on said received user voice command input.

9. A method for printing information at a printer portal, comprising the steps of:
   receiving via a telephonic device a user voice call at the printer portal;
   retrieving from electronic storage a physical location of the printer portal;

comparing the retrieved physical location of the printer portal to location of the telephonic device to determine a proximity of the telephonic device to the printer portal;
selectively enabling and disabling particular functionality of the printer portal, based on the proximity of the telephonic device to the printer portal,
transmitting a menu of available services to the user via the telephonic device;
receiving voice command input; and
printing a document at said printer portal if the voice command input includes a print request to print the document at said printer portal.

10. The method of claim 9, further comprising the step of: transmitting from a user telephone a user voice command input to the printer portal.

11. The method of claim 9, further comprising the step of: requesting voice command input of user access information.

12. The method of claim 9, wherein the menu of services is also based on the received user access information.

13. The method of claim 9, wherein the printer portal includes printer portal location.

14. The method of claim 9, further comprising the step of: transmitting a menu of services to a user based on the printer portal location.

15. The method of claim 9, further comprising the step of: requesting a document to be printed from a server by the printer portal in response to said received user voice command input.

16. The method of claim 9, further comprising the steps of: receiving a requested document to be printed from the server; and
printing a formatted version of the received document.

17. The method of claim 9, further comprising the step of: receiving information to be printed at the printer portal; and storing the received information in a print queue.

18. The method of claim 17, further comprising the step of: printing a stored received information in response to receipt of user access information in a user voice command input.

\* \* \* \* \*